United States Patent [19]

McAllister et al.

[11] Patent Number: 4,800,180

[45] Date of Patent: Jan. 24, 1989

[54] CERAMIC ARTICLES CONTAINING SILICON CARBIDE

[75] Inventors: Jerome W. McAllister, Hudson, Wis.; Lien-Huong T. Pham, St. Paul; Harold G. Sowman, Stillwater, both of Minn.

[73] Assignee: Minnesota Mining and Manufacturing Company, St. Paul, Minn.

[21] Appl. No.: 912,830

[22] Filed: Sep. 26, 1986

[51] Int. Cl.$^4$ .............................................. C04B 35/56
[52] U.S. Cl. ........................................ 501/88; 501/89; 501/95; 264/65; 264/DIG. 19
[58] Field of Search ............... 501/88, 89, 95; 264/65, 264/DIG. 19

[56] References Cited

U.S. PATENT DOCUMENTS

| | | | |
|---|---|---|---|
| 4,010,233 | 3/1977 | Winter et al. | 264/63 |
| 4,126,652 | 11/1978 | Oohara et al. | 264/DIG. 19 X |
| 4,298,558 | 11/1981 | Baney et al. | 264/65 |
| 4,314,956 | 2/1982 | Baney et al. | 264/65 |
| 4,467,043 | 8/1984 | Kriegesmann et al. | 501/88 |
| 4,515,742 | 5/1985 | Yajima et al. | 264/DIG. 19 X |
| 4,537,735 | 8/1985 | Enomoto et al. | 501/88 X |
| 4,571,331 | 2/1986 | Endou et al. | 264/56 X |

OTHER PUBLICATIONS

Katz et al., *Handbook of Fillers and Reinforcement for Plastics*, Van Nostrand, N.Y. (1978) pp. 446-464.
Kiagery et al., *Introduction to Ceramics* 2nd Ed., Wiley Interscience, N.Y. (1976) pp. 773-777.
Andersson et al., "Silicon Carbide Fibres and their Potential for Use in Composite Materials. Part 1", *Composites*, vol. 15, No. 1, Jan. (1984), pp. 16-24.

*Primary Examiner*—William R. Dixon, Jr.
*Assistant Examiner*—Andrew B. Griffis
*Attorney, Agent, or Firm*—Donald M. Sell; Lorraine R. Sherman

[57] ABSTRACT

A shaped article is described comprising a ceramic matrix and dispersed therein in the range of 5 to 30 weight percent mechanically added silicon carbide, said article having a modulus of elasticity (E) value of at least 10 percent greater than the inherent elastic modulus value of the fully dense host matrix. The articles are useful as high temperature stable reinforcement materials in composites requiring a high modulus of elasticity.

14 Claims, No Drawings

CERAMIC ARTICLES CONTAINING SILICON CARBIDE

FIELD OF THE INVENTION

This invention relates to shaped articles having a high modulus of elasticity comprising a ceramic matrix with silicon carbide dispersed therein and to a method of their production. The articles are useful as high temperature stable reinforcement materials in composites requiring high modulus of elasticity.

BACKGROUND OF THE INVENTION

Non-vitreous inorganic articles are becoming increasingly important in commerce as high performance materials. For example, non-vitreous ceramic fibers are finding utility not only as high temperature insulating materials, but also as reinforcing materials in composite structures, for example, in metals, glasses and ceramics. The reinforcement application requires fibers to have a high tensile strength and a high modulus of elasticity.

It is known that an oxide ceramic must be fully dense and have a polycrystalline structure if it is to achieve optimum tensile strength and modulus of elasticity (E). Whenever porosity is present, reduced or lower tensile strengths and modulus of elasticity can be expected. To reduce porosity in inorganic materials, the process of sintering is used which is normally accompanied by growth of the crystallites. Unfortunately, large crystallites or grains have the effect of reducing the tensile strength of polycrystalline fibers. Thus, the improvement in tensile strength attributed to the reduction in porosity by sintering is partially offset by the larger crystallites which have grown during sintering. Therefore, to produce inorganic fibers with a high tensile strength and a high modulus of elasticity (E), a dense ceramic (minimum porosity) with the smallest crystallites possible is preferred.

It is known to use organic precursors to produce a second SiC phase in oxide ceramics. U.S. Pat. No. 4,010,233 discloses inorganic fibers wherein a metal oxide phase contains a second dispersed phase. In all cases, the dispersed pahse is an in situ precipitation or chemical reaction product; for the examples utilizing SiC, it is obtained via chemical reaction of an organic precursor. The particle size is dependent upon the firing conditions used; for example, time, temperature and atmosphere. E values up to 269 GPa ($39 \times 10^6$ psi) are reported.

U.S. Pat. Nos. 4,298,558 and 4,314,956 disclose alkoxylated and phenoxylated methyl polysilane which are useful for the preparation of fine grained silicon carbide-containing ceramics. Pyrolysis and reaction of the ceramic precursor polymers provide the silicon carbide-containing ceramics.

SUMMARY OF THE INVENTION

Briefly, the present invention provides a shaped article comprising a ceramic matrix and having therein 5 to 30 weight percent mechanically-added silicon carbide, the article having a modulus of elasticity (E) value of at least ten percent higher, preferably 25 percent, more preferably 50 percent higher than that inherent in the fully dense host ceramic matrix. The silicon carbide is added to the ceramic matrix prior to densification as crystalline particles ahving an average diameter 0.1 micrometers or less.

Preferably, the surface of the shaped article is smooth, i.e. the average peak to valley surface roughness is less than 0.2 micrometer.

Although the concept of raising the modulus of elasticity by incorporation of a second higher modulus phase is know, see Kingery et al. "Introduction to Ceramics", John Wiley & Sons, New Yokr, N.Y. 1976, pages 723-777 (1976), it has not been proven practical for application to fibers or other sol-gel derived products having small dimensions. Commercially available, high modulus powders such as SiC, can be incorporated into these articles but the relatively large particle size (typically greater than 0.1 micrometer diameter and more typically greater than 1.0 micrometer diameter) leads to difficulties in spinning fibers, and more importantly leads to the formation of large flaws (voids, cracks, surface roughness) which negate any advantage which might be derived from the high modulus phase.

This invention provides ceramic articles having incorporated therein sufficient quantities of SiC such that the additive effect of the second phase can be achieved leading to a modulus of elasticity much higher than that inherent in the fully dense oxide ceramic.

U.S. Pat. No. 4,010,233 demonstrated improvements in the modulus of elasticity of alumina up to values of 269 GPa ($39 \times 10^6$ psi) using different dispersed phases to limit grain growth and minimize porosity. However, the improvements obtained are still well below the inherent modulus of elasticity of fully dense alumina [414 GPa ($60 \times 10^6$ psi)].

SiC derived from organic precursors may help control grain growth and porosity in oxide fibers and generally contains C and $SiO_2$ which lower its effective modulus of elasticity to 207 GPa ($-30 \times 10^6$ psi). Thus SiC derived from such materials would not be expected to produce a significant increase in the moduli of oxides already having moduli of elasticity in this range. In contrast, higher purity forms of SiC have moduli of elasticity greater than 690 GPa ($100 \times 10^6$ psi) making such materials much more effective as an additive to produce a modulus increase above that which would be expected from the oxide itself.

In the present invention, the modulus of elasticity of fibers such as aluminum-borosilicates and zirconium silicates can be raised to volues over 100 percent greater than that which could be obtained from the fully dense oxide fibers.

In this application:

"ceramic" means inorganic nonmetallic material consolidated by the action of heat, such as metal and non-metal oxides;

"fully dense" means essentially free of pores or voids;

"sol" means a fluid solution or a colloidal suspension;

"non-vitreous" means not formed from a melt of the final oxide composition;

"green" refers to the ceramic articles which are unfired, that is, not in their ceramic form;

"amorphous" means a material having a diffuse X-ray diffraction pattern without definite lines to indicate the presence of a crystalline component;

"crystalline" means having a characteristic x-ray or electron diffraction pattern;

"dehydration gelling" or "evaporative gelling" means that sufficient water and volatile material are removed from the shaped green fibers so that the form or shape of the fiber is sufficiently rigid to permit handling or processing without significant loss or distortion of the desired fibrous form or shape; all the water in the shaped fiber need not be removed. Thus, in a sense, this step can be called partial dehydrative gelling; and "continuous fiber" means a fiber (or multi-fiber article such as a strand) which has a length which is infinite for practical purpose as compared to its diameter.

DETAILED DESCRIPTION

This invention provides an inorganic non-vitreous ceramic article comprising a fully dense ceramic matrix and having therein 5 to 30 weight percent silicon carbide, which is dispersed throughout the ceramic matrix. The crystalline ultrafine (i.e., diameter less than 0.1 micrometer) silicon carbide particles are dispersed into the ceramic article precursor before shaping and converting to the ceramic form for the improvement of high temperature mechanical properties, e.g. modulus of elasticity.

In the present invention, the particles of SiC have a primary particle size of less than 0.1 micrometer, preferably less than 0.03 micrometer. It has been found that if particles, aggregates, and agglomerates greater than 0.1 micrometer are eliminated from the system, then the concept of utilizing a high modulus second phase to enhance the modulus of elasticity can be successfully applied to fibers.

In another aspect, the present invention provides a process for preparing the ceramic, high modulus of elasticity, articles of the present invention. The articles can be flakes, microspheres, bubbles, or random shaped particles, but preferably they are fibers.

In the process of the present invention, in preparing fibers the matrix phase is provided by a non-melt process comprising shaping a viscous concentrate of a mixture of precursor liquid and dispersed silicon carbide filler into a fiber form and then dehydratively or evaporatively gelling or hydrolyzing the drawn or spun fibers. These fibers can subsequently be dried to result in "green" or non-refractory fibers. Heating and firing the shaped green fibers removes water, decomposes and volatilizes undesired fugitive constituents and converts them into the refractory fibers of the invention.

Shaped and fired refractory fibers of this invention can be made by extruding in air the viscous fiberizable concentrate and then heating and firing the resulting green fibers to form continuous uniformly round, or oval, rod-like (elongated ovoid) or ribbon-like, strong, flexible, smooth, glossy refractory fibers. The fibers are useful in making textile fabrics, but are particularly useful as fillers and reinforcement for plastic, ceramic and metal matrix composites.

In one embodiment, the starting material or fiber precursor composition from which the refractory alumina-silica fibers of this invention can be made comprises a liquid mixture of a silicon compound, e.g., an aqueous dispersion of colloidal-silica and a compatible aqueous solution or dispersion of a water-soluble or dispersible aluminum compound, and, where used, compatible compounds, e.g., boron, zirconium, titanium, thorium, or phosphorus compounds. The compounds used are those which can be calcined to their respective oxides.

Suitable aluminum compounds which can be used as alumina precursors include water-dispersible alumina sols and water soluble aluminum salts such as aluminum formoacetate, aluminum nitrate, aluminum isopropylates, basic aluminum acetate, and mixtures thereof. The aluminum formoacetate Al(OH) (OOCH) (OCOCH$_3$) is a preferred source.

Where the refractory fibers of this invention are to contain boria, a suitable precursor is boric acid. Basic aluminum acetate, Al(OH)$_2$(OCOCH$_3$) 1/3 H$_3$BO$_3$, e.g., boric acid stabilized aluminum acetate, can be used as a boria precursor, alone or in combination with boric acid.

The precursor silica sol can be used with SiO$_2$ concentrations of 1 to 50 weight percent, preferably 15 to 35 weight percent; silica sols of varying concentrations are commercially available. The silica sol is preferably used as an aqueous dispersion or aquasol, but can also be used in the form of an organosol where the silica is colloidally dispersed in such water-miscible polar organic solvents as tehylene glycol or dimethyl formamide.

In a zirconia-silica system, the precursor zirconia sol can be used in the form of an aqueous solution of a suitable organic or inorganic acid water-soluble salt, the zirconia salts of aliphatic or acyclic mono or dicarboxylic acids having dissociation constants of at least $1.5 \times 10^{-5}$, such as formic, acetic, oxalic, malic, citric, tartaric and lactic acids and their halogenated derivatives such as chloroacetic acid. Zirconium diacetate is preferred because of its compatibility with colloidal silica and commercial availability and relatively low cost of its aqueous solution. Typical inorganic zirconium salts which can be used are zirconyl nitrate, zirconium carbonate and the like.

Preparation of different aqueous liquid mixtures, sols, or dispersible colloids or mixtures thereof which can be used for individual components of the matrix fibers of the invention are disclosed, for example, as follows:

| Fiber matrices | U.S. Pat. Nos. |
|---|---|
| titania | 4,166,147 |
| alumina-chromia-metal (IV) oxide | 4,125,406 |
| alumina-silica | 4,047,965 |
| thoria-silica-metal (III) oxide | 3,909,278 |
| alumina-boria and alumina-boria-silica | 3,795,524 |
| zirconia-silica | 3,793,041 |
| zirconia-silica | 3,709,706 |
| alumina-phosphorus oxide | |

The starting material or ceramic precursor compositions form the matrix phase to which the silicon carbide filler is added. The silicon carbide preferred for addition to alumina:boria:silica fibers is produced by radio frequency plasma synthesis from silane and methane starting materials as is known in the art. The SiC has an average size of $2 \times 10^{-2}$ micrometer, with an estimated size range of $5 \times 10^{-3}$ to $3 \times 10^{-2}$ micrometers (50 to 300 A), as measured by gas adsorption surface area measurement procedures in combination with X-ray diffraction and electron microscopy. However, in the ceramic matrix, the mechanically dispersed SiC filler may be present as a discrete phase or it may be dissolved in the ceramic matrix.

The specific surface area of the plasma synthesized SiC was measured to be 82 to 104 m$^2$/g. X-ray diffraction of the samples showed beta-SiC. Emission spectrographic analysis shows 30 ppm Al, 5 ppm Mg and 10 ppm Ni.

A silicon carbide preferred for the zirconiasilica fibers was produced by a carbothermal process according to the reaction:

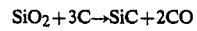

$$SiO_2 + 3C \rightarrow SiC + 2CO$$

where the carbon black was dispersed into a silica sol, the mixture was then dried, crushed, and fired in a vacuum furance at 1400° C. The resultant SiC material was ball milled in a solvent, e.g., acetone and filtered to the desired particle size. Silicon carbide in powder form (20nm diameter) can be dispersed into the zirconia-silica precursors by sonicating a mechanical mixture. A preferred method is to partially oxidize the SiC by heating at 600° C. in air for about three hours. The oxidized SiC is then mixed into the zirconia-silica precursor sol and fully dispersed by sonication.

When a fiber with high emissivity is desired, as is described in assignee's copending patent application Ser. No. 912,829, now U.S. Pat. No. 4,732,070, it is desirable to incorporate carbon into the structure of the ceramic fibers.

Each of the fiber precursor materials, initially will be a relatively dilute liquid, generally containing about 10–30 weight percent equivalent oxide, which can be calculated from a knowledge of the equivalent solids in the original materials and the amount used, or determined by calcining samples of the component starting materials. For the preparation of fibers, it is necessary to concentrate or viscosify the dilute liquid in order to convert it to a viscous or syrupy fluid concentrate which will readily gel when the concentrate is fiberized and dehydrated, for example when the concentrate is extruded and drawn in air to form the fibers. The mixture can be concentrated with a rotary evaporation flask under vacuum. The concentration procedures are well known in the prior art; see U.S. Pat. No. 3,795,524. Sufficient concentration will be obtained when the equivalent solids content is generally in the range of 25 to 55 weight percent (as determined by calcining a sample of the concentrate), and viscosities (Brookfield at ambient room temperature) are in the range of 10,000 to 100,000 mPa sec., preferably 40,000 to 100,000 mPa secd., depending on the type of fiberizing or dehydrative gelling technique and apparatus used and the desired shape of gelled fiber. High viscosities tend to result in fibers which are more circular in cross-section whereas low viscosities (e.g., less than 50,000 mPa sec.) may have a greater tendency to result in fibers which are more oval or rod-like (elongated ovoid) in cross-section.

In making continuous fiber, the viscous concentrates can be extruded through a plurality of orifices (e.g., a total of 10 to 400) from a stationary head and the resulting green fibers allowed to fall in air by the force of gravity or drawn mechanically in air by means of drawing rolls or a drum or winding device at a speed faster than the rate of extrusion. The concentrate can also be extruded through orifices from a stationary or rotating head and at the orifice exit blown by a parallel, oblique or tangential stream of high pressure air. The resulting blown green fibers are in essentially staple or short from with lengths generaly 25 cm or less (rather than the continuous filament form) and collected on a screen or the like in the form of a mat. Any of these forces exerted on the extruded, green fibers cause attenuation or stretching of the fibers, and can reduce their diameter by about 50 to 90 percent or more and increase their length by about 300 to 1,000 percent or more and serve to hasten or aid the drying of the green fibers.

The dehydrative gelling of the green fibers can be carried out in abmient air, or heated air if desired for faster drying. The drying rate can affect the shape of the fiber. The relative humidity of the drying air should be controlled since excess humidity will cause the gelled green fibers to stick together and excessively dry air tends to result in fiber breakage. Generally, air with relative humidity in the range of 20 to 60 percent at an operative temperature of 15°–30° C. is most useful, although drying air temperatures of 70° C. or more can be used. Where continuous green fibers are made and gathered together in parallel alignment or juxtaposition in the form of a multi-fiber strand, the fibers or strand should be treated with a size to prevent the fibers from sticking together. The fibers in the green or unfired gel form are dry in the sense that they do not adhere or stick to one another or other substrates and feed dry to the touch. However, they still may contain water and organics, and it is necessary to heat and fire the green fibers in order to remove these remaining fugitive materials and convert the green fibers into refractory fibers. These green fibers in their continuous form are preferably gathered or collected in the form of a strand. The strand then accumulates in a relaxes, loose, unrestrained configuration of offset or superimposed loops as in a "FIG. 8".

In firing the green fibers, care should be exercised to avoid ignition of combustible material (such as organics within or size upon the fiber) in or eveolved from the fibers. Such combustion may tend to cause overheating of the fibers resulting in imporper rate of temperature rise of the firing cycle and cause degradation of fiber properties.

The refractory products of this invention are useful as reinforcement in composites where in particular a high modulus is required. Of special importance are ceramic reinforcement materials capable of performing in a high temperature (upt to 1300° C.) oxidative atmosphere.

Representative samples of the fired fibers were characterized for tensile strength and modulus of elasticity. The procedure for testing tensile strength used a metal chain attached to a single fiber. The load applied to the fiber was measured by increasing the chain length electromechanically until a break occurred and then weighing the minimum length of chain necessary for break. The tensile strenth (TS) is calculated as $$TS = \frac{W}{A}$$

W = weight of chain length at break, and
A = cross-section area of the fiber.

The modulus of elasticity was determined from flexural vibration as described by E. Schreiber et al., "Elastic Constants and Their Measurement", McGraw-Hill Publishing Co., NY (1973) pages 88 to 90. The general equation which relates modulus of elasticity (Young's modulus) and the flexural resonant frequency ($f_E$) is:

$$E = \frac{(2\pi l^2 f_E)}{Km^2} \rho T$$

where
K = radius of gyration of the cross-section about the axis perpendicular to the plane of vibration.
m = constant depending on the mode of vibration.
T = shape factor, which depends upon the shape, size, and Poisson's ratio of the specimen and the mode of vibration.
l = length of the specimen
$\rho$ = density The objects and advantages of this invention are further illustrated by example, but it should be understood that the particular material used in these examples, as well as amounts thereof, and the various conditions and other details described, should not be construed to unduly limit this invention. Percents and parts are by weight unless otherwise specified.

The examples below describe adding silicon carbide, under various conditions, to two different host ceramic matrices. The matrices were 3:1:2 alumina-boria-silica and 1:1 zirconia:silica. The elastic moduli reported in the examples for the control samples, i.e. those without silicon carbide, were 165 GPa ($24 \times 10^6$ psi) for alumina-boria-silica, and 90 GPa ($13 \times 10^6$ psi) for zirconia-silica. These values correspond to published values of 151 GPa ($22 \times 10^6$ psi) for alumina-boria-silica [*Properties of 3M Nextel TM 312 Ceramic Fibers,* 3M Ceramic Fiber Products, St. Paul, MN (1986)] and 76–104 GPa ($11-15 \times 10^6$ psi) for zirconia-silica [J. F. Lynch et al., *Engineering Properties of Selected Ceramic Materials,* American Ceramic Society (1966) pp. 5.5.1–12].

EXAMPLE 1

Alumina-Boria-Silica having 3:1:2 molar ratio, with SiC

The silicon carbide dispersion was prepared by sonifying (Branson TM Sonifier TM 350 Smith Kline Co., Shelton, Conn.) 1.7 grams of SiC (Los Alamos National Laboratory, hereinafter LANL) in 30 cc acetone for 10 minutes with cooling by dry ice. The dispersion was mixed with 100 cc distilled water containing 0.05 gram anionic surfactant (Lomar PWA TM, Diamond Shamrock Corp.) and sonified for 10 minutes more. This dispersion was mixed with 144 g of a 17% solids 3:1:2 molar ratio alumina-boria-silica precursor liquid and sonified for another 10 minutes. The fiber precursor material was made according to the procedure of Example 3 in U.S. Pat. No. 4,047,965, excepting for the greater amount of boric acid for the $B_2O_3$ in the 3:1:2 molar ratio in the composition; the aluminum formoacetate was made by the digestion of aluminum metal in formic and acetic acids [aluminum powder (120 grams) was dissolved in a 90° C. solution of 2200 grams water, 236 grams formic acid, and 272 grams acet5ic acid, over a period of eight hours]. The resulting precursor liquid was concentrated in a rotary evaporation flask (Buchi, Switzerland) operating at 35°–45° C. and 736 mm Hg and the volatiles were removed until the viscosity was greater than 75,000 mPa sec. Fibers were produced from the viscous sol by extruding through forty 102-micrometer diameter orifices and by collecting the fibers on a wheel turning at 30 meters per minute. The fibers were divided into two batches with one fired in air at 850° C. for 15 minutes and the second batch at 950° C. for 15 minutes. The heat-rise schedule was about 7° C./min. with a 15 minute pause-soak at 430° C. and the black fibers were removed promptly when 950° C. was attained.

The fibers were oval shaped with a major axis of about 22 micrometers and a minor axis of about 11 micrometers.

The average tensile strength of the 950° C. fiber was 1035 MPa (150,000 psi) and for the 850° C. fibers 1200 MPa (175,000 psi) (Basis: 1 psi=6900 Pa). The 850° C. and 950° C. fibers moduli of elasticity measured as 180 GPa ($26 \times 10^6$ psi) and 172 GPa ($25 \times 10^6$ psi), respectively. The 3:1:2 alumina:boria:silica control fiber (Nextel TM, 3M, St. Paul, Minnesota) had a tensile strength of 1550 MPa (225,000 psi) and a modulus of elasticity of 165 GPa ($24 \times 10^6$ psi).

EXAMPLE 2

A 20 wt % of silicon carbide in a matrix of alumina-boria-silica (3:1:2) was prepared as follows:

Step 1: 1.7 grams of silicon carbide (Los Alamos National Laboratory) were sonified (Branson TM Sonifier TM 250, Smith Kline Co., Shelton, Conn.) in 40 cc acetone for 10 minutes.

Step 2: The dispersion was slowly mixed with 60 cc distilled water containing 0.1 gram anionic surfactant (Lomar PWA TM, Diamond Shamrock, Morristown, N.J.) and sonified for another ten minutes.

Step 3: The mixture was placed on a rotating flask (Rotovapor TM, Buchi, Switzerland) until the acetone was removed.

Step 4: Repeat step (1) for another 1.7 grams of SiC.

Step 5: The dispersion from step (4) was then mixed with the mixture from step (3). At this point the sold contained 3.4 grams SiC, 40 cc acetone, 0.1 gram anionic surfactant and 60 cc water.

Step 6: The resulting sol from step 5 was then added to 72 grams of a 17% solids 3:1:2 molar ratio alumina-boria-silica precursor liquid and sonified again for another 10 minutes.

Step 7: The resulting precursor liquid was concentrated in a rotary evaporator flask as described in Example 1.

Fibers were produced from the viscous sol by extruding it through a spinnerette having forty-102 micrometer diameter holes and collecting the fibers on a wheel at a linear speed of 30 meters/min.

The fibers were fired in air for 15 minutes at 950° C. after heating at a rate of 7.5° C. per minute from room temperature.

The fired black fibers were characterized for tensile strength and modulus of elasticity.

Three separate batches of fiber were prepared by this procedure. The tensile strengths and moduli of elasticity data were as follows:

| Tensile strength: | Number of measurements |
|---|---|
| Run 1 965 MPa ($140 \times 10^3$ psi) | 10 |
| Run 2 724 MPa ($105 \times 10^3$ psi) | 5 |
| Run 3 1014 MPa ($147 \times 10^3$ psi) | 7 |

| Modulus of elasticity | No. of fibers | Number of measurements |
|---|---|---|
| Run 1 269 GPa = ($39 \times 10^6$ psi) | 5 | 24 |
| Run 2 324 GPa = ($47 \times 10^6$ psi) | 5 | 30 |
| Run 3 324 GPa = ($47 \times 10^6$ psi) | 7 | 27 |

EXAMPLE 3

This example was prepared as in Example 2 except 51. g of SiC, 120 cc acetone and 90 grams of alumina-boriasilica precursor liquid were used.

Two separate batches of black fibers were made and the properties were as follows:

| Tensile strength: | Number of measurements |
|---|---|
| Run 1 800 MPa ($116 \times 10^3$ psi) | 7 |
| Run 2 807 MPa ($117 \times 10^3$ psi) | 11 |

| | No. of | Number of |

| Modulus of elasticity | fibers | measurements |
| --- | --- | --- |
| Run 1 290 GPa (42 × 10⁶ psi) | 11 | 43 |
| Run 2 359 GPa (52 × 10⁶ psi) | 6 | 25 |

EXAMPLE 4

This example used silicon carbide obtained from cabothermal synthesis according to the following procedure.

The raw materials for the SiC was a 3:1 raio of carbon black (Monarch TM 1100 by Cabot) and silica (Nalco 2327), according to the reaction:

$$SiO_2 + 3C \rightarrow SiC + 2CO$$

The carbon black was dispersed into the silica sol, dried, crushed and vacuum fired in an Astro TM furnace (Astro Industries, Inc., Santa Barbar, CA, U.S.A.) at 1400° C. for 5 hours.

This SiC powder had a particle size range of 600-900 Angstoms. Coarse particles had been separated from the powder by ball milling in acetone solvent for 20 hours. The dispersion was filtered through a No. 4 Whatman filter and refiltered through a Balston filter tube grade CO. The acetone was evaporated. This powder was dispersed into a 1:1 molar ratio zirconia-silica precursor.

A zirconia silica precursor liuqid was prepared by mixing 302.84 grams zirconium acetate (Harshaw/Filtrol Partnership, Elyria, Ohio) into 110.6 grams silica sol (Nalco TM -1034A, Nalco Chemical Company, Oak Brook, ILL.). This gave 1:1 molar ratio of zirconia-silica precursor of 27.3 wt % calcined solids.

The dispersion of silicon carbide in zirconia-silica precursor liquid was prepared by ball milling 10 grams of the SiC powder, as described in Example 5, into 179 grams of zirconia precursor for 60 hours. The dispersion was filtered through Whatman TM No. 4 filter paper, then filtered again through Whatman TM No. 54. Twenty grams of lactic acid (85 wt % aqueous solution) and 6.7 grams of formamide were added to the above filtered dispersion.

The resulting precursor liquid was concentrated under vacuum in a rotary evaporation flask (Buchi, Switzerland) partly submerged in a water bath at temperatures of 35 to 45° C. until it was viscous enough to enable the pulling of fibers with a glass rod. Fibers were spun from viscous sol with a 75 micrometer orifice spinnerette and 1.2 MPa (175 psi) extrusion pressure. The fibers were fired in air in an electric furnace (Lemont TM KHT, Lemont Scientific, State College, PA.), at 950° C. for 15 minutes after heating at a rate of 7.75° C./minute.

The average tensile strength of the resulting fibers was 703 MPa (102,000 psi). The average modulus of elasticity for 10 fibers was 124 GPa (18×10⁶ psi) (a 3.6 density was used based on weight percent of silicon carbide in the matrix).

The average tensile strength of the zirconiz silica control was 1014 MPa (147,000 psi).

The average modulus of elasticity of the zirconia silica control was 90 GPa (13×10⁶ psi).

EXAMPLE 5

Two grams of SiC (LANL) were partially oxidized at 600° C. for three hours in air in a Lindberg TM furnace (Lindberg Furnace C., Watertown, Wis.). The partially oxidized SiC was mixed in 47 grams of a 17 % solids 3:1:1.3 molar ratio alumina-boria-silica precursor, sonified for 10 minutes and fulterred through a No. 54 Whatman filter paper. The resulting prevurosr liquid was concentrated in a rotary evaporator flash as described in example 1.

The concentrated sol was extruded using a spinnerette with 40 holes of 76 micrometer diameter each and an extrusion pressure of 1.4 MPa. The continuous fibers obtained were dark brown in color and were fired in an electric tube furnace (KHT 250, Lemont Scientific State College, PA) to 1300° C. and held for 15 minutes. The furnace used a rate of heating of 7.4° C. per minute. The fibers were black. The oxidized SiC powder contained about 42 wt % silica as measured by carbon analysis. This caused the resulting composite fiber to be 12 wt % silicon carbide in a matrix of alumina:boria:-silica: 3:1:2 (mole raio).

The 1300° C. fired fibers had an average tensile strength of 932 MPa (135×10³ psi) and and average modulus of elasticity of 200 GPa (29×10⁶ psi).

Various modifications and alterations of this invention will become apparent to those skilled in the art without departing from the scope and spirit of this invention, and it should be understood that this invention is not to be unduly limited to the illustrative embodiments set forth herein.

We claim:

1. A shaped article consisting essentially of a ceramic matrix and dispersed therein 5 to 30 weight percent silicon carbide, said silicon carbide having a primary particle size of less than 0.1 micrometer and a modulus of elasticity (E) value greater than 690 GPa, and said article having a modulus of elasticity (E) value of at least 10 percent greater than the inherent modulus of elasticity (E) value of the fully dense host matrix.

2. The shaped article according to claim 1 wherein said ceramic matrix is alumina-silica, alumina chromia, alumina-boria, alumin-boria-silica, alumina-phosphorus oxide. titania, zirconia-silica, or combinations thereof.

3. The shaped article according to claim 1 wherein said ceramic matrix is alumina-boria-silica in a 3:1:2 mole ratio.

4. The shaped article according to claim 1 wherein said ceramic matrix is zirconia-silica in a 1:1 mole ratio.

5. The shaped article according to claim 1 having an average peak to valley surface roughness of less than 0.2 micrometer.

6. The shaped article according to claim 1 wherein said modulus of elasticity (E) value is at least 25 percent greater than the inherent modulus of elasticity (E) value of the fully dense host matrix.

7. The shaped article according to claim 2 wherein said modulus of elasticity (E) value is at least 50 percent greater than the inherent modulus of elasticity (E) value of the fully dense host matrix.

8. The shaped article according to claim 1 wherein said silicon carbide particles have an average diameter of less than 0.03 micrometer.

9. The shaped article according to claim 1 which is selected from the group consisting of a fiber, flake, and sphere.

10. The shaped article according to claim 1 which is a bubble.

11. A shaped article consisting essentially of a ceramic matrix and dispersed therein 5 to 30 weight percent silicon carbide, said silicon carbide having a primary article size of less than 0.1 micrometer and a modulus of elasticity (E) value greater than 690 GPa, and wherein said silicon carbide is derived from a carbothermal process or a radio frequency plasma synthesis process, and said article having a modulus of elasticity (E) value of as least 10 percent greater than the inherent modulus of elasticity (E) value of the fully dense host matrix.

12. The shaped article according to claim 11 wherein said silicon carbide is partially oxidized.

13. The shaped article according to claim 12 wherein said article is a fiber.

14. The shaped article according to claim 13 wherein said article is stable up to a temperature of 1300° C.

* * * * *

UNITED STATES PATENT AND TRADEMARK OFFICE
CERTIFICATE OF CORRECTION

PATENT NO. : 4,800,180

DATED : January 24, 1989

INVENTOR(S) : Jerome W. McAllister et al.

It is certified that error appears in the above-identified patent and that said Letters Patent is hereby corrected as shown below:

Column 1, line 44, delete "pahse" and insert therefor -- phase --.

Column 1, line 67, delete "ahving" and insert therefor -- having --.

Column 2, line 7, delete "Yokr" and insert therefor -- York --.

Column 2, line 45, delete "volues" and insert therefor -- values --.

Column 2, line 63, delete "dehydration" and insert therefor -- dehydrative --.

Column 5, line 3, delete "furance" and insert therefor -- furnace --.

Col. 5, line 38, delete "secd.," and insert therefor -- sec., --.

UNITED STATES PATENT AND TRADEMARK OFFICE
CERTIFICATE OF CORRECTION

PATENT NO. : 4,800,180

DATED : January 24, 1989

INVENTOR(S) : Jerome W. McAllister et al.

It is certified that error appears in the above-identified patent and that said Letters Patent is hereby corrected as shown below:

Col. 5, line 57, delete "generaly" and insert therefor -- generally --.

Col. 5, line 66, delete "abmient" and insert therefor -- ambient --.

Col. 6, line 13, delete "feed" and insert therefor -- feel --.

Col. 6, line 20, delete "relaxes" and insert therefor -- relaxed --.

Col. 6, line 25, delete "eveolved" and insert therefor -- evolved --.

Col. 6, line 27, delete "imporper" and insert therefor -- improper --.

Col. 6, line 34, delete "upt" and insert therefor -- up --.

UNITED STATES PATENT AND TRADEMARK OFFICE
CERTIFICATE OF CORRECTION

PATENT NO. : 4,800,180

DATED : January 24, 1989

INVENTOR(S) : Jerome W. McAllister et al.

It is certified that error appears in the above-identified patent and that said Letters Patent is hereby corrected as shown below:

Col. 7, line 44, delete "acet5ic" and insert therefor -- acetic --.

Col. 8, line 21, delete "sold" and insert therefor -- sol --.

Col. 9, line 19, delete "Barbar" and insert therefor -- Barbara --.

Col. 9, line 28, delete "liuqid" and insert therefor -- liquid --.

Col. 9, line 59, delete "zirconiz" and insert therefor -- zirconia --.

Col. 10, line 2, delete "fulterred" and insert therefor -- filtered --.

Col. 10, line 3, delete "prevurosr" and insert therefor -- precursor --.

UNITED STATES PATENT AND TRADEMARK OFFICE
CERTIFICATE OF CORRECTION

PATENT NO. : 4,800,180

DATED : January 24, 1989

INVENTOR(S) : Jerome W. McAllister et al.

It is certified that error appears in the above-identified patent and that said Letters Patent is hereby corrected as shown below:

Col. 10, line 18, delete "raio" and insert therefor -- ratio --.

Col. 10, line 40, delete "oxide." and insert therefor -- oxide, --.

Signed and Sealed this

Twenty-fifth Day of July, 1989

Attest:

DONALD J. QUIGG

Attesting Officer

Commissioner of Patents and Trademarks